(12) United States Patent
Gutman et al.

(10) Patent No.: US 6,480,096 B1
(45) Date of Patent: Nov. 12, 2002

(54) METHOD AND APPARATUS FOR THEFT DETERRENCE AND SECURE DATA RETRIEVAL IN A COMMUNICATION DEVICE

(75) Inventors: Jose Gutman, Boynton Beach, FL (US); Thomas Ray Braxton, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/111,941

(22) Filed: Jul. 8, 1998

(51) Int. Cl.7 .......................... H04Q 7/14; G08B 13/14
(52) U.S. Cl. ..................... 340/5.31; 340/5.74; 340/7.41
(58) Field of Search ............................. 340/5.31, 5.32, 340/5.74, 7.41, 7.55, 5.3; 380/247, 271, 273, 286; 711/163, 164; 713/200, 201, 202, 182–186; 455/410, 411

(56) References Cited

U.S. PATENT DOCUMENTS

| 4,639,726 A | 1/1987 | Ichikawa et al. ...... 340/825.44 |
| 4,839,628 A | 6/1989 | Davis et al. ............. 340/311.1 |
| 4,993,068 A * | 2/1991 | Piosenka .................... 713/186 |
| 5,221,838 A | 6/1993 | Gutman et al. ............. 235/379 |
| 5,363,447 A * | 11/1994 | Rager .......................... 380/273 |
| 5,412,721 A * | 5/1995 | Rager .......................... 380/273 |
| 5,748,084 A | 5/1998 | Isikoff ......................... 340/568 |

FOREIGN PATENT DOCUMENTS

WO    WO 96/27174    9/1996

\* cited by examiner

Primary Examiner—Edwin C. Holloway, III
(74) Attorney, Agent, or Firm—Randi L. Dulaney

(57) ABSTRACT

A communication device having a theft deterrence feature includes a selective call receiver (16), a transmitter (16), a memory (18) coupled to the selective call receiver and containing an encryption key (40) and an address (41), a secure memory (26) coupled to the selective call receiver containing secure data that is accessible with the encryption key and further containing a stealth code, a tampering detection circuit (21) for detection of unauthorized use by an unauthorized user of the communication device or another electronic device coupled to the selective call device, and a processor (22). When the processor detects unauthorized use, it is to delete the encryption key, transmit a stealth code to a base station transparent to the unauthorized user when unauthorized use is detected, and receive data into the secure memory location transparent to an unauthorized user of the communication device.

25 Claims, 4 Drawing Sheets

METHOD AND APPARATUS FOR THEFT DETERRENCE AND SECURE DATA RETRIEVAL IN A COMMUNICATION DEVICE

FIELD OF THE INVENTION

The present invention is directed to a wireless communication device, and more particularly to a communication device and method capable of detecting unauthorized use and securing the data coupled or inputed to the communication device.

BACKGROUND OF THE INVENTION

Theft of lap top computers or other portable data storing devices such as palm top computers, sub-notebook computers or personal digital assistants are on the rise. In many instances, the value of the data stored in these devices are worth many times the cost of the hardware retaining such data. Maintaining such data secure and attempting to retrieve such data without allowing third parties access to the data becomes ever more crucial as consumers and businesses become more dependent on these portable computing devices. The integration of wireless devices such as selective call receivers or pagers with these portable computing devices provides an avenue for deterring theft of the hardware device as well as the data contained within the hardware. Encryption and password protection for such devices may limit some access to these devices, but further deterrence and secure data recovery can be achieved with a wireless connection to the hardware device. Thus, a need exists for using a wireless connection to further deter theft of portable computing devices, maintain data secure in portable computing devices and potentially recover the data and other unauthorized user input even though the hardware may be physically inaccessible to its rightful owner.

DETAILED DESCRIPTION

Integrating a paging function into a portable computing device provides some unexpected benefits in deterring theft of the data and the portable computing device by taking advantage of the wireless and wireline communication capabilities of the device. Particularly beneficial is the potential ability to recover the data contained in a lost or stolen device. Ideally, if data including pages or messages are maintained in a secure memory, the device can attempt to send the data back to a paging central base station or paging terminal while the location of the device can be determined to restore the device to an authorized user. Although the present invention is being described with respect to a paging system, it should be understood by those skilled in the art that the present invention could equally be embodied using other forms of wireless communications including cellular, PCS, satellite, and two-way trunked radios.

Figure 1:
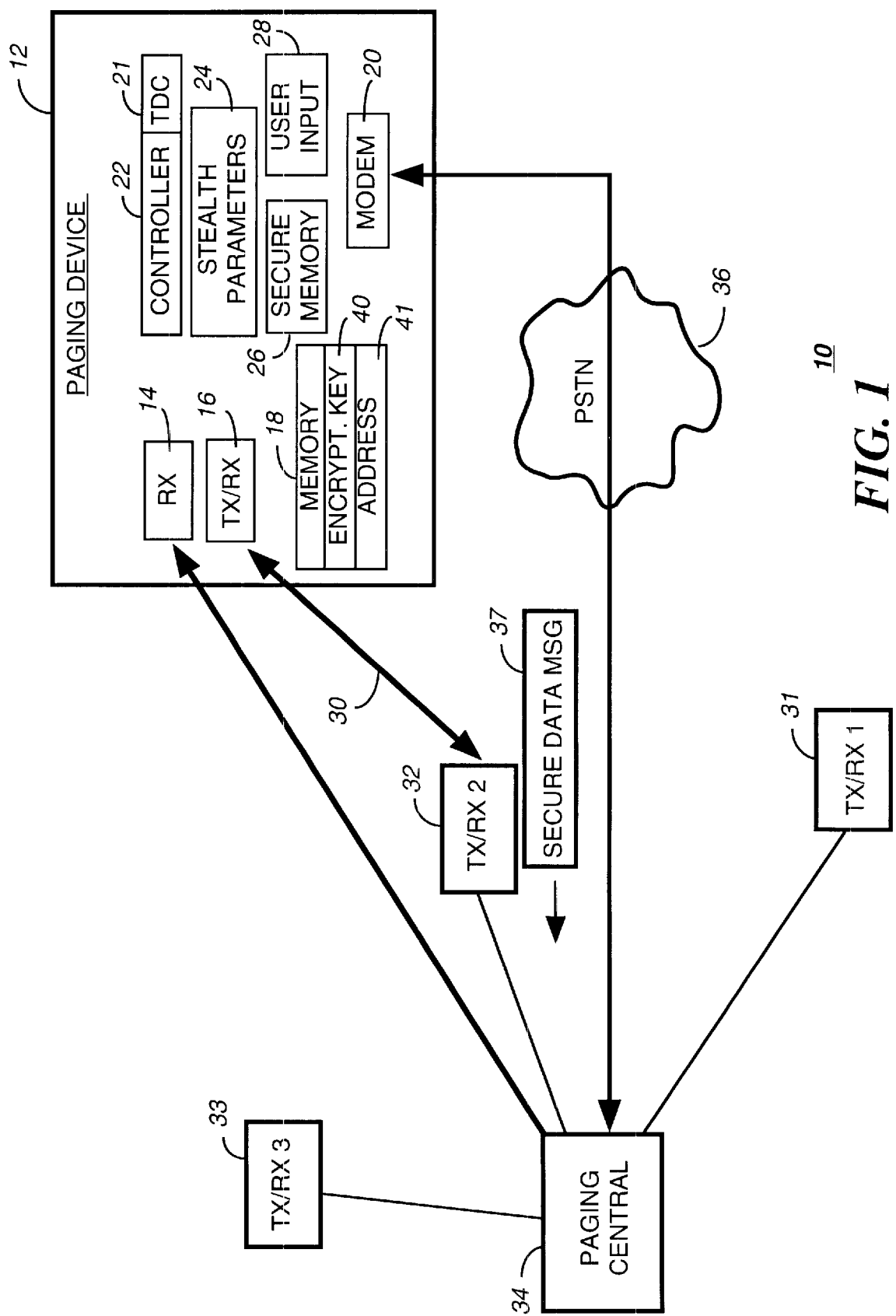
FIG. 1 is a block diagram of a system providing theft deterrence and data retrieval capability in accordance with the present invention.

The combination computing device or host device with communication device 12, as illustrated in FIG. 1, (hereinafter "Paging Device"), may include a paging receiver 14 only, a paging transceiver 16, a wireline modem 20, or a combination thereof. A paging system 10 includes a Paging Central control and administrative center 34 which handles all system communications with the Paging Device and a plurality of geographically dispersed base stations 31, 32, and 33 coupled to the Paging central. Also, the modem 20 can couple to the Paging Central through a Public Switching Telephone Network (PSTN) 36.

In one aspect of the invention, the Paging Device 12 can detect that it has been lost or stolen. For example, the Paging Device can monitor a user input interface 28 which would detect when an unauthorized user is attempting access to the Paging Device functions and/or data. Typically, this involves a user entering a password which is compared by the Paging Device with a predetermined password of an authorized user. Tamper detection events resulting in a secure mode could also include altering the housing or shielding of the Paging Device, disabling an antenna, or removal or altering of circuitry of the Paging Device. Additionally, the Paging Device can monitor user inputs including biological signal entries from a user attempting to gain access and compare the biological signals entered by the user with a predetermined biological signal or a biological profile for an authorized user. Such information as keyboard input data as well as user fingerprint data, voice print, retinal scan, iris pattern, or other similar biological characteristic data unique to a user can be compared against predetermined information before allowing access to the functions or data of the Paging Device.

When the Paging Device enters a secure mode upon detecting unauthorized use, the Paging Device can secure certain key data in a Secure Memory 26 (See FIG. 1). For example, it can maintain certain private data encrypted and secure in the Secure Memory where the encryption key is wiped from memory, and, therefore, the data can not be extracted until an authorized user reconfigures the Paging Device with correct encryption/decryption information. This would afford some data security in the event that a device was lost or stolen.

After detecting that the Paging Device is lost or stolen, as discussed above, the Paging Device can also enter a STEALTH MODE for communicating certain information with the Paging Central without detection from the immediate user of the Paging Device. The Paging Device could utilize certain Stealth Parameters 24 (See FIG. 1 and FIG. 2) in a secure memory to configure itself for a stealth mode of operation. It will then preferably attempt to communicate back with the Paging Central at a first opportunity with a secure data message 30 through the nearest base station (base station 32 as shown). Alternatively, the Paging Device can attempt to communicate back with the Paging Central during the normal course of operations by the unauthorized user, but transparent to the unauthorized user. In addition, the stealth mode would optionally include an automatic transfer of any or all unsecured data into a secured format. The stealth mode may also involve erasure of certain unsecured data if desired. In a two-way implementation, once all the secure data has been transmitted back to the Paging Central and the Paging Device received confirmation of such receipt of by the Paging Central, the secure data in the Paging Device can be automatically erased.

In a preferred embodiment, the Stealth Parameters 24 are unique for that Paging Device and for the authorized user, and preferably these Stealth Parameters can not be reprogrammed (they are fixed in hardware/firmware separate from the Secure Memory 26). Therefore, even if an unauthorized user attempts to reprogram the Paging Device with new paging address information, etc., the Paging Device will continue to operate in a stealth mode. The Paging Device can operate with the "new" paging address information, while still operating in the original stealth mode from the stealth mode parameters stored in a secure memory. Hence, the current user (i.e., the unauthorized user), after re-programming the Paging Device, may be unaware that the device is still operating in a stealth mode against their interest. In other words, there should be no perceptible (visible or audible or otherwise) indication given to the unauthorized user that the Paging Device is operating in a stealth mode.

Ideally, once the Paging Device is retrieved, the Paging Central administrative personnel in combination with the original authorized user would be able to reconfigure the Stealth Parameters to restore the Paging Device to normal operation. For example, the original user can supply a secret encryption key that is used to configure the Stealth Parameters. This can be optionally provided by a storage device such as electronic storage or other medium. Only with this key can the original Secure Memory (with the secure data) and the original operation customized for such original user be restored to the Paging Device. In this way, the data remains secure until it is returned to the possession of the original user. Thus, even the Paging Central administrative personnel could not have access to the data. Only the original user would have access to the secure data.

Figure 2:
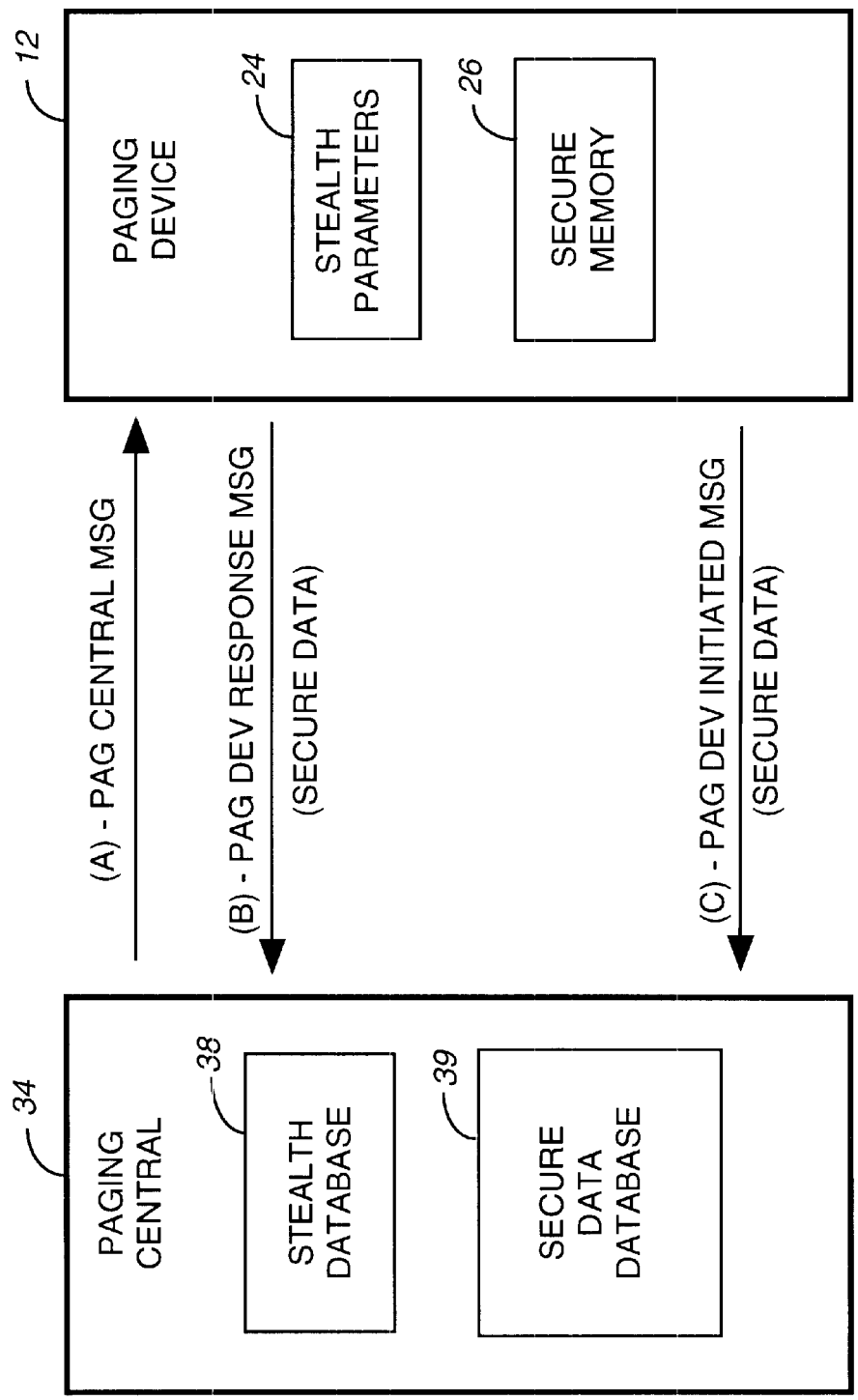
FIG. 2 is a block diagram of a selective call device and a paging base station in accordance with the present invention.

In a first aspect of the invention, when in the stealth mode, the Paging Device can monitor for a message (page) from the Paging Central (see FIG. 2, message A). This message indicates that the Paging Device is within the (outbound) paging coverage area. Additionally, because the Paging Device is in a stealth mode, it preferably does not alert the unauthorized user and stores the message into a Secure Memory, particularly if the device has not been reprogrammed with a new address and retains the authorized user's address. In this aspect of the invention, anything that it can not store into Secure Memory will not be stored in the Paging Device.

In another aspect of the invention, the Paging Device preferably remains in a stealth mode even after being reprogrammed with a new address, wherein the Paging Device preferably alerts the unauthorized user when a message is received and further stores any messages in a secondary memory. The Paging Device operates to appear fully functional to the unauthorized user, while actually denying access to the Secure Memory and other functions if desired.

If the Paging Device is in a two-way paging system, and if it is equipped with the transceiver 16 (see FIG. 1), the Paging Device can send a message such as an ack-back message (See FIG. 2, message B) including a "stealth message" to the Paging Central via the nearest base station for the two-way paging system. Alternatively, the Paging Device can independently initiate and send an asynchronous (ALOHA type) page via the nearest two-way base station to send the stealth message to the Paging Central. (See FIG. 2, message C). Alternatively, if the Paging Device attempts registration with a two-way base station, the stealth code or stealth message can be sent along with a registration request. The stealth message will include a stealth code from the Paging Device informing the Paging Central that the Paging Device is within the paging coverage area and in a "stealth mode".

Further, the stealth message preferably includes at least a portion of the secure data from the Secure Memory in the stealth message. This secure data remains in a secure (encrypted) form that only the original user can restore to usable form. Paging Central personnel (unauthorized users) preferably have no way to decrypt and use this data without the original authorized user. In this way, the Paging Device sends the secure data back to the Paging Central utilizing one or more stealth messages. Eventually, the Paging Central will recover the secure data for the original user which often is much more valuable than the cost of losing the Paging Device. With the original data secured for the original user, a new duplicate Paging Device can be configured for the original user. Further, rather than automatically deleting secure data in the Paging Device upon confirmation of receipt by the Paging Central, the deletion could occur after an over-the-air command request by the authorized user after the original authorized user decrypts and recovers the secure data from the Paging Central.

In addition to the stealth code and secure data, the Paging Device could also send location and/or registration information and/or user input information from the current user, in the ack-back stealth message to the Paging Central via the nearest basestation (see FIG. 1) to inform the Paging Central of the approximate location of the Paging Device and to help identify the current (unauthorized) user. This stealth message therefore can send SECURE DATA (30 or 37) back to the Paging Central. The SECURE DATA remains secure even while in the posession of the Paging Central personnel. The original authorized user is the only one that knows the passcode for encryption/decryption of the secure data. Again, when the original user actually recovers the SECURE DATA in a duplicate Paging Device, the original user can restore the form of the secure data into usable form. Further, the original user can confirm when to delete the memory of the device in the possession of an unauthorized user.

In a second aspect of the invention, when in the stealth mode, the Paging Device can monitor for a modem connection with the PSTN (see FIG. 1). In this case, using the Stealth Parameters, the Paging Device can attempt to dial-out via the PSTN to reach a predetermined destination telephone station that is coupled to the Paging Central (see FIG. 1). Using modem communication, the Paging Device can send the stealth message, similar to that discussed above, to provide the SECURE DATA back to the Paging Central via the PSTN using modem communication.

Especially when the Paging Device is equipped with only a one-way paging receiver, it is useful for the Paging Device to be able to attempt to send the stealth message via the PSTN. Of course, the two-way paging transceiver equipped Paging Device can also attempt to send stealth messages via the PSTN. Ideally, the Paging Device will attempt all possible means to send the stealth messages back to the Paging Central to resist theft and to recover the SECURE DATA to the original user. As illustrated in FIG. 2, these stealth messages can be sent as responses to receiving a Paging Central Message, or, alternatively, the Paging Device can independently initiate sending a stealth message via the PSTN to send the SECURE DATA.

In order of priority while in a stealth mode, the Paging Device would preferably attempt to determine location of the Paging Device by either monitoring registration messages to paging base stations or triangulating the wireless signals (or by other known methods) or by tracing a phone line connection (possibly using caller ID) if applicable or by analyzing transmitted unauthorized user data to a paging central which could contain names, addresses and other identifying data that could be parsed and extracted from input into the Paging Device's memory.

Preferably, the Paging Central 34 keeps a Stealth Database 38 with information received from the Paging Devices that are in stealth mode. In this way, Paging Central can communicate with the Paging Devices in the stealth mode and can receive stealth messages from the Paging Devices to collect and store the SECURE DATA in a Secure Data database 39 in the Paging Central. Therefore, by using the stealth mode and sending SECURE DATA, while restricting access to secure data and received pages destined for the original user, the Paging Device of the present invention hinders and resists the unauthorized use or sale of misappropriated portable computing devices and the data stored therein while recovering the secure data to the original authorized user. The present invention goes a long way toward curbing the high theft rate of portable computing devices which are then resold or cannibalized for parts or for the DATA stored therein. More importantly for corporate users of portable computing devices they would be afforded an extra layer of security for proprietary information that could be extracted from a stolen device.

Referring again to FIG. 1, a communication device 12 having a theft deterrence feature comprises a selective call receiver 14, a memory 18 coupled to the selective call receiver and containing an encryption key 40 and an address 41 as well as a secure memory 26 coupled to the selective call receiver containing secure data that is accessible with the encryption key and further containing a stealth code (24). The communication device 12 may also include a transmitter (preferably part of a transceiver 16) for transmitting the stealth code to a base station when non-authorized use is detected. The communication device may also include a modem 20 for transmitting a stealth code to a paging terminal when non-authorized used is detected and the communication device is coupled to a phone line via a PSTN 36. The communication device also has a tampering detection circuit 21 for detection of unauthorized use of the communication device or another electronic device coupled to the selective call device and a processor 22 that is programmed to perform several functions when detecting unauthorized use. The tampering detection circuit 21 may form a portion of the processor 22 or function as a separate device. The processor functions preferably comprise deleting the encryption key and receiving data into the secure memory location transparent to an unauthorized user of the communication device. The processor may be further programmed to transmit any secure data in the secure memory via the transmitter when non-authorized use is detected or alternatively via the modem when non-authorized use is detected and the communication device is connected to a phone line. Additionally, the communication device 12 is programmed to transmit user identification information to the base station to identify the unauthorized user when non-authorized use is detected. The user identification information can include location codes, heart rates, fingerprints, conductivity, (and other biometric status information such as retinal scans, iris patterns, or facial characteristics), and user input information among other information. Preferably, the user identification information is transmitted to the paging terminal to identify an unauthorized user when non-authorized use is detected, wherein such transmission is transparent to the unauthorized user.

The communication device 12 may also have a processor programmed to transmit a stealth code to a base station transparent to the unauthorized user when unauthorized use is detected and may further be programmed to transmit secure data or user input information over the air transparent to the unauthorized user. As described before, the user input information could include location codes, heart rates, fingerprints, and conductivity information as well as data files (email messages, letters & notes) that the unauthorized user may have inputed into the communication device 12.

Figure 3:
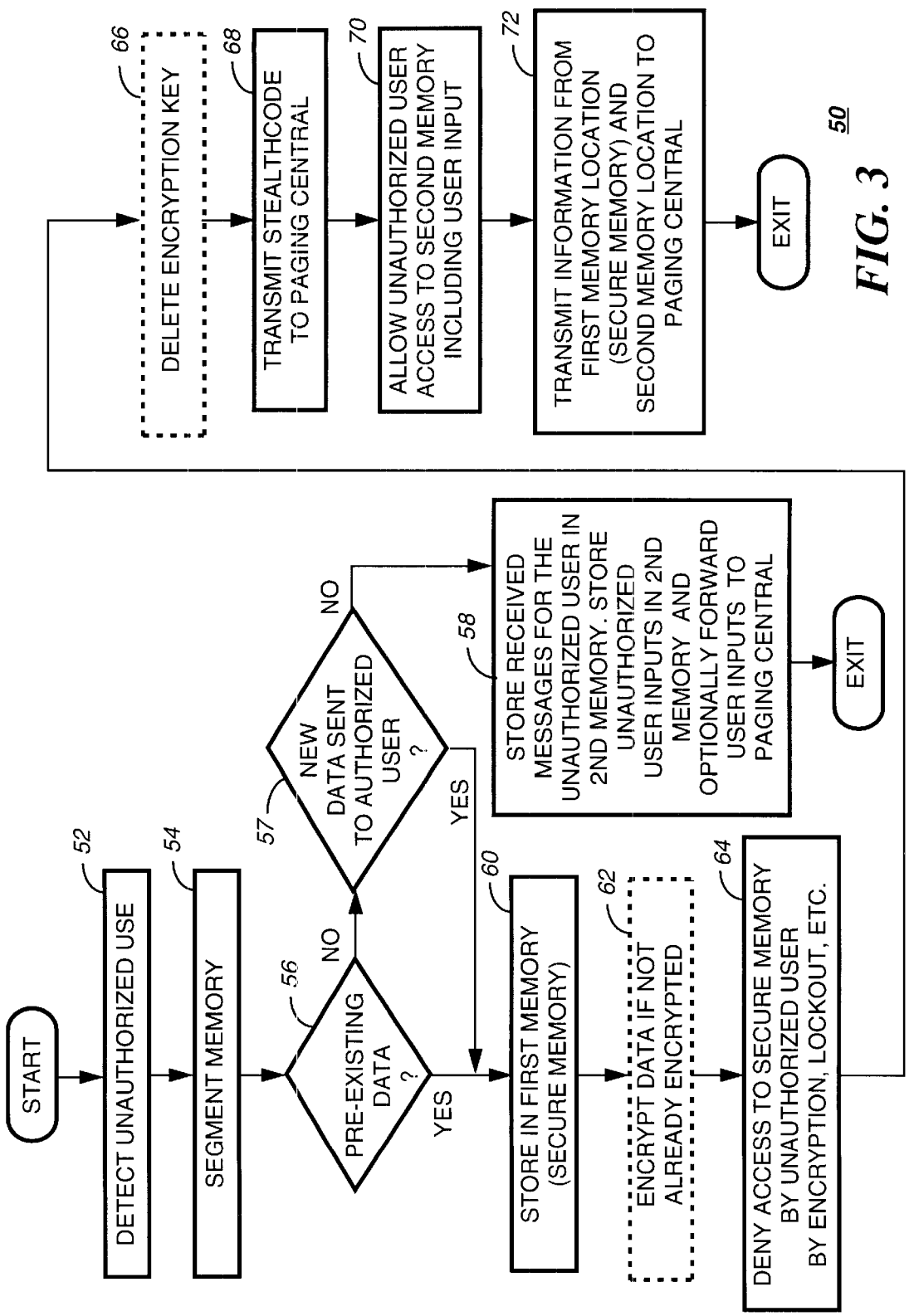
FIG. 3 is a flow chart illustrating a method for deterring theft and retrieving data in accordance with the present invention.

Referring to FIG. 3, a method 50 for recovering existing data from and deterring theft of a host data device coupled to a selective call receiver comprises the step 52 of detecting unauthorized use of the host data device by an unauthorized user and the step 54 of segmenting a memory at the host data device. At decision block 56, in a preferred embodiment, if there is pre-existing data, all of it is stored in a first memory location which serves as a secure memory at step 60. If the data at decision block 57 is new data that is received and directed for the authorized user, then this new data is also stored at the secure memory at step 60. If the new data is from or for the unauthorized user, the this unauthorized user's data is stored in a second memory location at step 58. If the data stored in the first memory is not already encrypted, then this data is optionally encrypted at step 62. Then the method 50 further denies access to the first memory location to the unauthorized user, such as by encryption, password lockout or other means known to those skilled in the art. Optionally, the method 50 deletes an encryption key at step 66 so that only the authorized user can gain access to the data stored in the secure memory. Note that messages can continue to be encrypted and stored into the secure memory but they cannot be recovered from the secure memory without the deleted encryption key which is only known to the original user. (For example, a public key can encrypt, but an associated private key is needed to decrypt). The decryption key may be stored in a non-secure memory location within the host data device of the communication device. When in the stealth mode, the decryption key can be deleted to prevent unauthorized access to secure data in the device. Then, a stealth code is transmitted to a central station notifying the central station of such unauthorized use at step 68. The method also allows the unauthorized user to access and input information to and from the second memory location at step 70. Additionally, data from the first memory location and the second memory location is transmitted to the paging central in a manner transparent to the unauthorized user at step 72. The data in the second memory location can comprise biometric inputs of heart rates, electrocardiograms, fingerprints, conductivity, voice prints, retinal scans, iris patterns as well as unauthorized user inputs from a keyboard.

Figure 4:
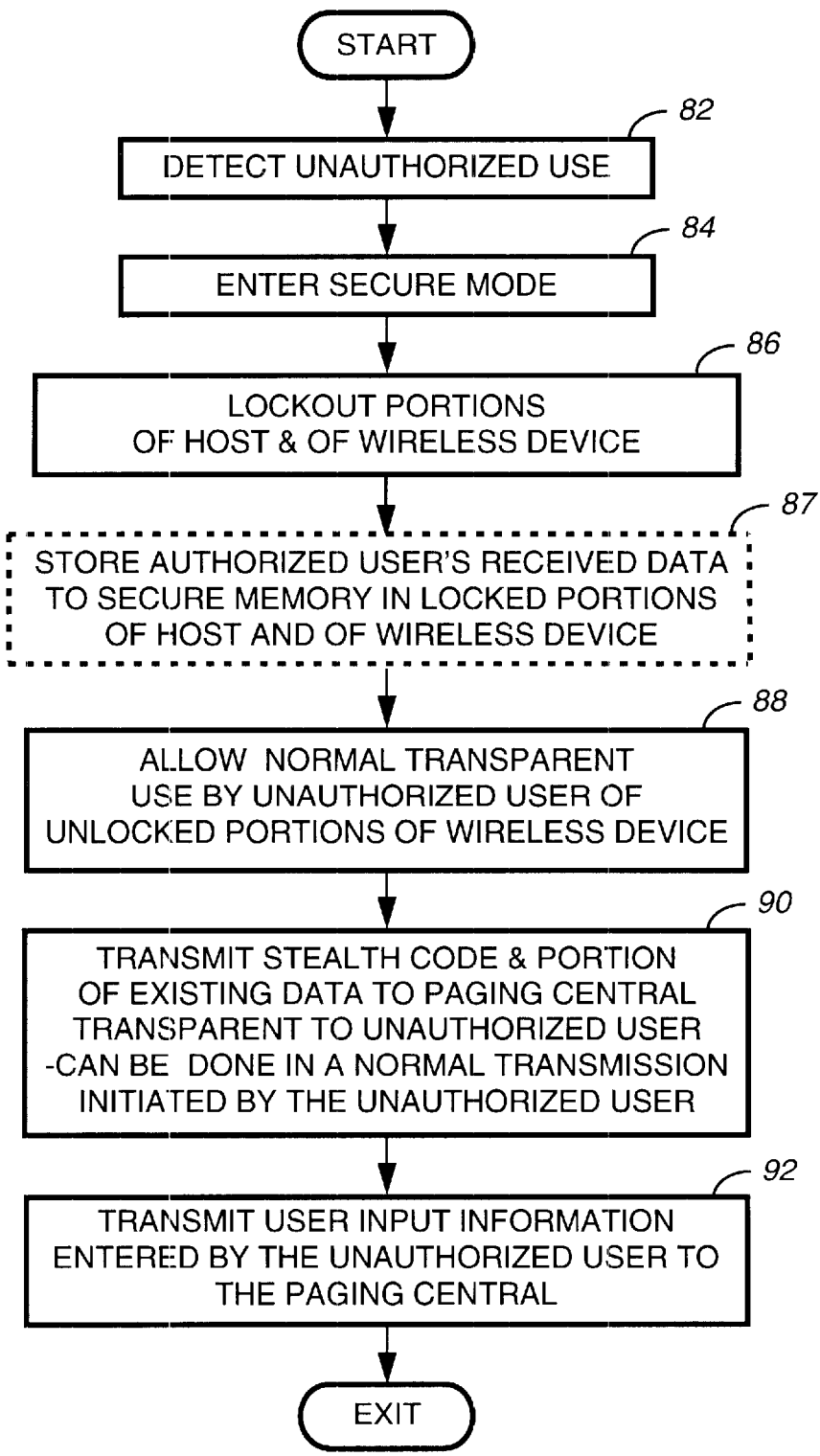
FIG. 4 is another flow chart illustrating a method for deterring theft and retrieving data in accordance with the present invention.

Referring to FIG. 4, a method 80 of remotely recovering existing data from a host data device coupled to a two-way wireless communication device is shown. The method preferably comprises the steps of operating the host data device and the two-way wireless communication device in a secure mode at step 84 upon detection of unauthorized use by an unauthorized user at step 82, wherein the secure mode operates transparent to the unauthorized user allowing the unauthorized user to use portions of the host device and the two-way wireless device in a normal fashion at step 88 while locking out portions of the host data device and the two-way wireless device at step 86. Optionally, received message data is stored to secure memory at step 87. Then, at step 90, a stealth code is transmitted followed by at least a portion of the existing data to a central station. The data is preferably transmitted securely such as by encrypting the data before transmission. This can be achieved during a normal transmission initiated by the unauthorized user or alternatively the two-way wireless device can initiate these transmissions at the earliest opportunity while avoiding being detected by the unauthorized user. The method 80 may also include the step 92 of transmitting unauthorized user input information to the central station.

The above description is intended by way of example only and is not intended to limit the present invention in any way except as set forth in the following claims.

What is claimed is:

1. A communication device having a theft deterrence feature, comprising:
   a selective call receiver;
   a memory coupled to the selective call receiver and containing an encryption key and at least one address;
   a secure memory coupled to the selective call receiver containing secure data that is accessible with encryption/decryption information including the encryption key and further containing a stealth code;
   a tampering detection circuit for detection of unauthorized use of the communication device or another electronic device coupled to the selective call device; and
   a processor that is programmed when detecting unauthorized use to:
      delete the encryption key;
      receive data into the secure memory location transparent to an unauthorized user of the communication device; and
      allow access to the secure data in the secure memory by an authorized user reconfiguring the communication device with the encryption/decryption information.

2. The communication device of claim 1, wherein the communication device further comprises a transmitter for transmitting the stealth code to a base station when non-authorized use is detected.

3. The communication device of claim 1, wherein the communication device further comprises a modem for transmitting the stealth code to a paging terminal when non-authorized used is detected and the communication device is coupled to a phone line.

4. The communication device of claim 2, wherein the processor is further programmed to transmit any secure data in the secure memory via the transmitter when non-authorized use is detected.

5. The communication device of claim 3, wherein the processor is further programmed to transmit any secure data in the secure memory via the modem when non-authorized use is detected.

6. The communication device of claim 2, wherein a user identification information is transmitted to the base station to identify an unauthorized user when non-authorized use is detected.

7. The communication device of claim 6, wherein the user identification information is selected from the group consisting of location codes, biometric status information, and user input information.

8. The communication device of claim 3, wherein a user identification information is transmitted to the paging terminal to identify an unauthorized user when non-authorized use is detected, wherein such transmission is transparent to the unauthorized user.

9. The communication device of claim 8, wherein the user identification information is selected from the group consisting of location codes, biometric status information, and user input information.

10. The communication device of claim 1, wherein the memory contains a first address for the authorized user and a second address for the unauthorized user, wherein data received into the secure memory includes a first message data directed to the first address and a second message data directed to the second address, and wherein the processor is further programmed to:
    receive the first message data into the secure memory and append the first message data to the secure data already stored in the secure memory, and
    receive the second message data into the memory for access and use by the unauthorized user.

11. The communication device of claim 10, wherein the received message data is encrypted using public key encryption and stored in the secure memory and wherein the processor is further programmed to delete a decryption key when detecting unauthorized use.

12. A communication device having a theft deterrence feature, comprising:
    a selective call receiver;
    a transmitter;
    a memory coupled to the selective call receiver and containing an encryption key and an address;
    a secure memory coupled to the selective call receiver containing secure data that is accessible with encryption/decryption information including the encryption key and further containing a stealth code;
    a tampering detection circuit for detection of unauthorized use by an unauthorized user of the communication device or another electronic device coupled to the selective call device; and
    a processor that is programmed when detecting unauthorized use to:
       delete the encryption key;
       transmit a stealth code to a base station transparent to the unauthorized user when unauthorized use is detected;
       receive data into the secure memory location transparent to an unauthorized user of the communication device; and
       allow access to the secure data in the secure memory by an authorized user reconfiguring the communication device with the encryption/decryption information.

13. The communication device of claim 12, wherein the processor is further programmed to transmit secure data over the air transparent to the unauthorized user.

14. The communication device of claim 12, wherein the processor is further programmed to transmit user identification information to identify an unauthorized user transparent to the unauthorized user.

15. The communication device of claim 14, wherein the user identification information includes identifying information selected from the group consisting of location codes, biometric status information, and user input information.

16. A method for recovering data from and deterring theft of a host data device coupled to a selective call receiver of an authorized user, comprising the steps of:
    detecting unauthorized use of the host data device by an unauthorized user;
    segmenting a memory at the host data device, wherein a plurality of existing data is stored in a first memory location and an unauthorized user's data is stored in a second memory location;
    denying access to the first memory location to the unauthorized user;
    transmitting a stealth code to a central station notifying the central station of such unauthorized use;

storing data received for the authorized user in the first memory location;

allowing the authorized user to access and input information to and from the first memory location;

allowing the unauthorized user to access and input information to and from the second memory location; and transmitting data from the first memory location and the second memory location transparent to the unauthorized user.

17. The method of claim 16, wherein the method further comprises the step of encrypting the data in the first memory location.

18. The method of claim 16, wherein the method further comprises the step of deleting an encryption key stored in a non-secure memory location within the host data device.

19. The method of claim 16, wherein the method further comprises the step of transmitting user input information from the second memory location to the central station wherein the user identification information identifies the unauthorized user, and further wherein the user identification information is selected from the group consisting group consisting of location codes, biometric status information, and user input information.

20. A method of remotely recovering data of an authorized user from a host data device coupled to a two-way wireless communication device, comprising the steps of:

operating the host data device and the two-way wireless communication device in a secure mode upon detection of unauthorized use by an unauthorized user, wherein in the secure mode:
- at least a portion of the data of the host data device is encrypted,
- only the authorized user can access the encrypted data, and
- the unauthorized user can access and use the host device and the two-way wireless device other than the encrypted data in a normal fashion;

transmitting a stealth code followed by the encrypted data from the two-way wireless communication device to a central station;

configuring a new host data device with the encrypted data transmitted to the central station; and operating the new host data device by the authorized user decrypting and recovering the encrypted data.

21. The method of claim 20, wherein the step of transmitting the stealth code and the encrypted data is achieved during a normal transmission initiated by the unauthorized user.

22. The method of claim 20, wherein the step of transmitting the stealth code and the encrypted data is followed by the step of transmitting unauthorized user identification information to the central station.

23. The method of claim 20 further comprising:

receiving a confirmation of receipt of the stealth code and encrypted data from the central station by the host data device coupled to the two-way wireless communication device; and deleting the encrypted data from the host data device.

24. The method of claim 23 further comprising:

receiving an over the air command request by the host data device coupled to the two-way wireless communication device from the authorized user prior to the deleting of the encrypted data step.

25. Within a communication device operating on a first address, a method for protecting data of an authorized user comprising the steps of:

detecting unauthorized reprogramming of the communication device from the first address to a second address by an unauthorized user;

segmenting a memory of the communication device, wherein a plurality of existing data including a plurality of stealth parameters is stored in a first memory location and an unauthorized user's data is stored in a second memory location;

operating the communication device in a stealth mode using the stealth parameters, wherein the stealth mode comprises:
- denying access to the first memory location to the unauthorized user,
- storing authorized data received on the first address in the first memory location,
- allowing the authorized user to access and input information to and from the first memory location,
- storing unauthorized data received on the second address in the second memory location, and
- allowing the unauthorized user to access and input information to and from the second memory location.

* * * * *